United States Patent
Yaegashi et al.

(10) Patent No.: US 7,847,258 B2
(45) Date of Patent: Dec. 7, 2010

(54) RADIATION IMAGING DEVICE

(75) Inventors: Hiroyuki Yaegashi, Kanagawa (JP); Rui Shen, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 185 days.

(21) Appl. No.: 12/176,034

(22) Filed: Jul. 18, 2008

(65) Prior Publication Data
US 2009/0026379 A1    Jan. 29, 2009

(30) Foreign Application Priority Data
Jul. 26, 2007    (JP)    ............... 2007-194238

(51) Int. Cl.
*G01T 1/24*    (2006.01)
(52) U.S. Cl. ................................. 250/370.08
(58) Field of Classification Search .............. 250/208.1, 250/336.1, 370.01, 370.08, 370.09, 370.11
See application file for complete search history.

(56) References Cited
U.S. PATENT DOCUMENTS
2005/0205903 A1    9/2005    Hioki
2006/0108529 A1*    5/2006    Saito et al. ............... 250/338.4
2007/0114447 A1*    5/2007    Shoji et al. ............... 250/483.1

FOREIGN PATENT DOCUMENTS
| JP | 8-116044 A | 5/1996 |
| JP | 2005-303266 A | 10/2005 |
| JP | 2006-86493 A | 3/2006 |

\* cited by examiner

*Primary Examiner*—David P Porta
*Assistant Examiner*—Mark R Gaworecki
(74) *Attorney, Agent, or Firm*—Birch, Stewart, Kolasch & Birch, LLP

(57) ABSTRACT

A radiation imaging device 12 has a phosphor film 8; a photoelectric conversion portion 13 including an upper electrode 6, a lower electrode 2, and a photoelectric conversion film 4 disposed between the electrodes; a signal output portion 14 including a field effect thin film transistor 10 having an active layer 24 formed from an amorphous oxide and that outputs a signal corresponding to electric charges generated by the photoelectric conversion portion; and a substrate 1 on which the signal output portion, the photoelectric conversion portion and the phosphor film are formed in this order. Each of pixel portions is made up of the signal output portion, the photoelectric conversion portion and the phosphor film, and the signal output portion and the photoelectric conversion portion in each of the pixel portions are formed so as to have an overlapping portion in a thickness direction.

14 Claims, 1 Drawing Sheet

RADIATION IMAGING DEVICE

CROSS REFERENCE TO RELATED APPLICATION

This application claims priority under 35 USC 119 from Japanese Patent Application No. 2007-194238, the disclosure of which is incorporated herein by reference.

BACKGROUND OF THE INVENTION

1. Field of the Invention

The present invention relates to a radiation imaging device, specifically, a radiation imaging device that outputs an image signal corresponding to a radiation dose transmitted through an imaging target.

2. Description of the Related Art

In a medical field, a radiation imaging unit that irradiates radiation such as X-rays to a human body and detects an intensity of radiation transmitted through a human body to image an interior of the human body is used. The radiation imaging unit like this is largely divided into a direct type imaging unit and an indirect type imaging unit. In the direct type imaging unit, radiation transmitted through a human body is directly converted to an electrical signal to extract externally, and in the indirect type imaging unit, radiation transmitted through a human body is incident once on a phosphor to be converted into visible light and the visible light is converted to an electrical signal to extract externally.

As a radiation imaging device that is used in a indirect type imaging unit, an X-ray imaging device where, on a substrate, a photoelectric conversion element, a capacitor and a TFT (switching element) are disposed in the same layer structure is proposed (see Japanese Patent Application Laid-Open (JP-A) No. 08-116044, FIG. 20(b)). In the radiation imaging device, for each of pixels, a pair of upper and lower electrodes, a photoelectric conversion portion disposed between the electrodes and containing a photoelectric conversion film constituted of an inorganic photoelectric conversion material such as amorphous silicon, a capacitor for storing electric charges generated by the photoelectric conversion film and a TFT switch that converts the electric charges stored in the capacitor to a voltage signal to output are formed side by side on a substrate, and further thereon, a phosphor made of cesium iodide (CsI) is disposed through a protective film (SiN film).

SUMMARY OF THE INVENTION

According to an aspect of the present invention, a radiation imaging device that includes:

a phosphor film that emits light by absorbing radiation transmitted through an imaging target;

a photoelectric conversion portion that includes an upper electrode, a lower electrode, and a photoelectric conversion film disposed between the upper and lower electrodes, the photoelectric conversion film containing an organic photoelectric conversion material that absorbs light emitted from the phosphor film;

a signal output portion that includes a field effect thin film transistor having an active layer formed from an amorphous oxide and that outputs a signal corresponding to electric charges generated by the photoelectric conversion portion; and a substrate on which the signal output portion, the photoelectric conversion portion and the phosphor film are formed in this order, wherein a plurality of pixel portions are arranged on the substrate, each of which is made up of a part of the signal output portion, the photoelectric conversion portion and the phosphor film, and the respective parts of the signal output portion and the photoelectric conversion portion in each of the pixel portions are formed so as to have an overlapping portion in a thickness direction, is provided.

DETAILED DESCRIPTION OF THE INVENTION

Hereinafter, an exemplary embodiment of the present invention will be described with reference to the drawings.

When a photoelectric conversion film of a radiation imaging device is constituted of an inorganic photoelectric conversion material such as silicon, owing to a broad absorption spectrum thereof, other than light emitted from a phosphor, X-ray transmitted through the phosphor is partially absorbed. As the result, a signal corresponding to absorbed X-ray becomes noise to deteriorate image quality.

Furthermore, when a layer configuration of a photoelectric conversion portion and a layer configuration of a switching element are made common and the photoelectric conversion portion and the switching element are formed side by side, similarly to the photoelectric conversion portion, in the switching element as well, a signal corresponding to X-ray becomes noise.

Furthermore, in general, in a radiation imaging device, a light-receiving area (an area that a photoelectric conversion film occupies) thereof is necessarily set identical to a magnitude of, for instance, a chest of a human body, that is, a light-receiving area is demanded to be large. However, like the radiation imaging device, when a photoelectric conversion portion, a capacitor and a TFT switch are formed side by side on a substrate, while, in each of the pixel portions, a formation region of a switching element and a capacitor becomes large and an area per pixel is large, a light-receiving area that corresponds to a photoelectric conversion portion becomes small; accordingly, high image quality is not obtained as a whole.

Figure 1:
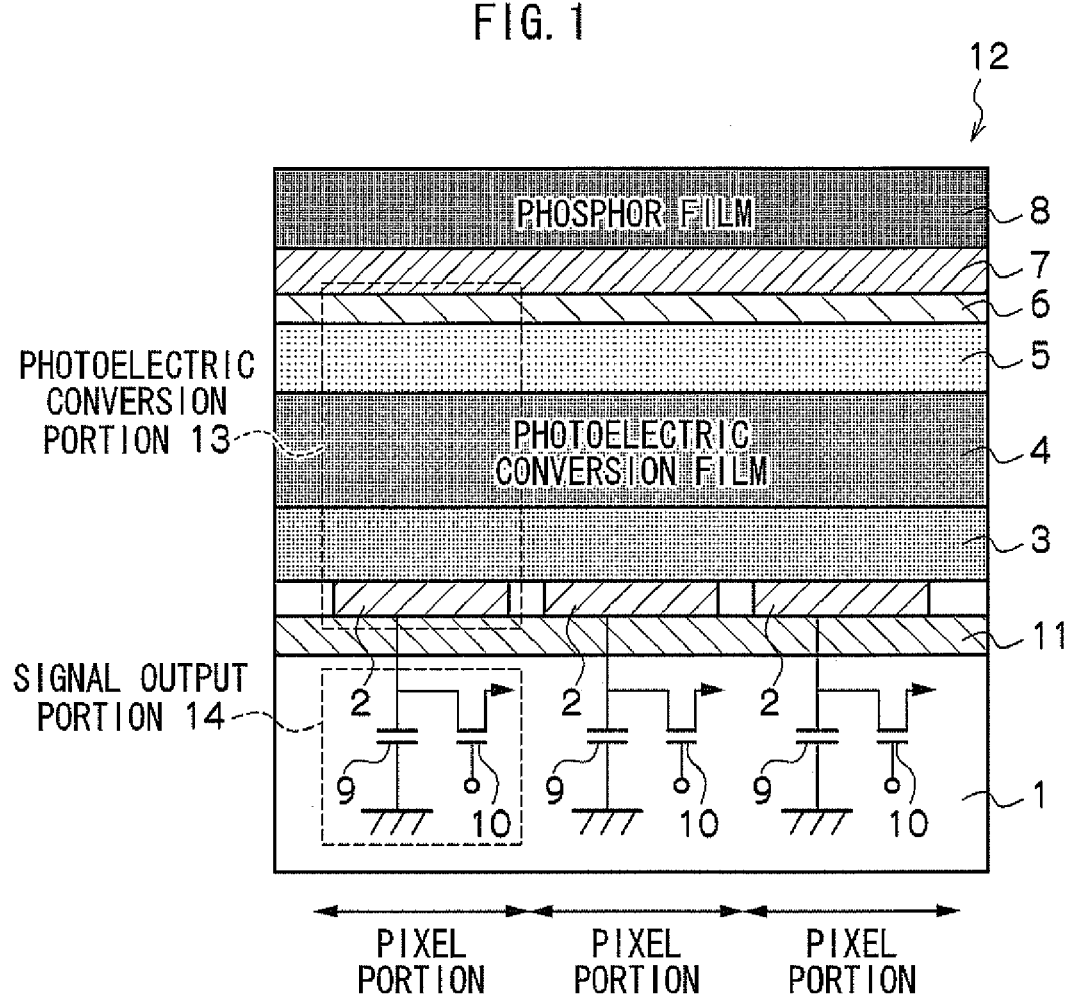
FIG. 1 is schematic sectional view showing a rough configuration of three pixel portions of a radiation imaging device that is an exemplary embodiment of the present invention.

FIG. 1 is a sectional schematic view schematically showing a configuration of three pixel portions of a radiation imaging device that is one exemplary embodiment of the invention. The radiation imaging device 12 has a structure that a signal output portion 14, a photoelectric conversion portion 13 and a phosphor film 8 are formed in this order on a substrate 1 such as a semiconductor substrate, quartz substrate or glass substrate, and a pixel portion is made up of a part of the signal output portion 14, the photoelectric conversion portion 13 and the phosphor film 8. Plural pixel portions are arranged on the substrate 1, and the respective parts of the signal output portion 14 and the photoelectric conversion portion 13 in each of the pixel portions are formed so as to have an overlapping portion.

<Phosphor Film>

The phosphor film 8 is formed on the photoelectric conversion portion 13 through a transparent insulating film 7 and made from a phosphor that emits light by converting radiation incident from above (a side opposite to the substrate 1) to light. When such the phosphor film 8 is disposed, radiation transmitted through an imaging target is absorbed into the phosphor film 8 to emit light.

The wavelength region of light emitted by the phosphor film 8 is preferably in the visible light region (wavelength: 360 to 830 nm). In order to realize monochromatic imaging by use of the radiation imaging device 12, a green wavelength region is more preferably included.

As the phosphor used for the phosphor film 8, specifically, when X-rays are used as the radiation for forming images, a phosphor that contains cesium iodide (CsI) is preferable, and CsI (Ti) (cesium iodide to which titanium has been added) having an emission spectrum in the range of 420 to 600 nm when X-rays are irradiated is particularly preferably used. An emission peak wavelength in a visible light region of CsI (Ti) is 565 nm.

Further, the thickness of the phosphor film 8 is 600 μm or less, although this also depends on the energy used.

<Photoelectric Conversion Portion>

The photoelectric conversion portion 13 includes an upper electrode 6, a lower electrode 2 and a photoelectric conversion film 4 disposed between the upper and lower electrodes, and the photoelectric conversion film 4 is made up of an organic photoelectric conversion material that absorbs light emitted from the phosphor film 8.

The upper electrode 6 is, because light generated by the phosphor film 8 has to be incident on the photoelectric conversion film 4, preferably made up of a conductive material transparent at least to an emission wavelength of the phosphor film 8, and specifically a transparent conducting oxide (TCO) that is high in the transmission to visible light and low in resistance value is preferably used. As the upper electrode 6, a thin film of metal such as Au may be used. However, in order to obtain the transmittance of 90% or more, a resistance value tends to increase; accordingly, the TCO is preferred. For instance, ITO, IZO, AZO, FTO, $SnO_2$, $TiO_2$ and ZnO are preferably used and, from the viewpoints of the process simplicity, low resistance and transparency, the ITO is most preferred. The upper electrode 6 may be formed as one layer common over an entire pixel portion or may be divided in correspondence with each of pixel portions.

Furthermore, the thickness of the upper electrode 6 may be, for instance, 30 nm or more and 300 nm or less.

The photoelectric conversion film 4 contains an organic photoelectric conversion material, absorbs light emitted from the phosphor film 8 and generates electric charges corresponding to the absorbed light. The photoelectric conversion film 4 containing such an organic photoelectric conversion material has a sharp absorption spectrum in a visible region and absorbs hardly any electromagnetic waves other than light emitted by the phosphor film 8; accordingly, generation of noise when radiation such as X-rays is absorbed by the photoelectric conversion film 4 is effectively suppressed.

In the organic photoelectric conversion material that constitutes the photoelectric conversion film 4, in order to most efficiently absorb light emitted from the phosphor film 8, the absorption peak wavelength thereof is preferably as close to the emission peak wavelength of the phosphor film 8 as possible. Ideally, the absorption peak wavelength of the organic photoelectric conversion material and the emission peak wavelength of the phosphor film 8 coincide. However, when the difference therebetween is small, light emitted from the phosphor film 8 may be sufficiently absorbed into the photoelectric conversion film. Specifically, the difference between the absorption peak wavelength of the organic photoelectric conversion material and the emission peak wavelength with respect to radiation of the phosphor film 8 is preferably 10 nm or less and more preferably 5 nm or less.

As the organic photoelectric conversion material capable of satisfying such a condition, for instance, quinacridone-based organic compounds and phthalocyanine-based organic compounds are cited. For instance since an absorption peak wavelength in a visible region of quinacridone is 560 nm, when quinacridone is used as an organic photoelectric conversion material and CsI (Ti) is used as a material of the phosphor film 8, the difference between the peak wavelengths may be 5 nm or less; accordingly, an amount of electric charges generated in the phosphor film 4 may be substantially maximized.

Here, a photoelectric conversion film 4 applicable to a radiation imaging device according to the invention will be more specifically described.

An electromagnetic wave absorption/photoelectric conversion site in a radiation imaging device according to the invention is made up of a pair of electrodes 2, 6 and an organic layer containing an organic photoelectric conversion film 4 sandwiched between the electrodes 2, 6. The organic layer may be formed, more specifically, by stacking or mixing a site that absorbs an electromagnetic wave, a photoelectric conversion site, an electron transporting site, a hole transporting site, an electron blocking site, a hole blocking site, a crystallization inhibition site, electrodes interlayer contact improvement site and so on.

The organic layer preferably contains an organic p-type compound or an organic n-type compound.

The organic p-type semiconductor (compound) is a donor type organic semiconductor (compound) mainly represented by hole transporting organic compounds and refers to an organic compound with properties such that it is likely to release electrons. More specifically, when two organic materials are brought into contact, the one that has the smaller ionization potential is the organic p-type semiconductor (compound). Accordingly, as the donor type organic compound, as long as it is an organic compound having an electron releasing property, any organic compound may be used. Examples thereof include triarylamine compounds, benzidine compounds, pyrazoline compounds, styrylamine compounds, hydrazone compounds, triphenylmethane compounds, carbazole compounds, polysilane compounds, thiophene compounds, phthalocyanine compounds, cyanine compounds, merocyanine compounds, oxonol compounds, polyamine compounds, indole compounds, pyrrole compounds, pyrazole compounds, polyarylene compounds, condensed aromatic carbocyclic compounds (naphthalene derivatives, anthracene derivatives, phenanthrene derivatives, tetracene derivatives, pyrene derivatives, perylene derivatives and fluoranthene derivatives) and metal complexes having a nitrogen-containing heterocyclic compound as a ligand. Without restricting thereto, an organic compound smaller in the ionization potential than an organic compound used as the n-type (acceptor type) compound may be used as a donor type organic semiconductor.

The organic n-type semiconductor is an acceptor type organic semiconductor (compound) mainly represented by an electron transporting organic compound and means an organic compound having the nature that is likely to accept the electrons. In more detail, when two organic compounds are used in contact, one that is larger in the electron affinity is the organic n-type semiconductor. Accordingly, the acceptor type organic compound, as far as it has the electron-accepting property, all organic compounds may be used. Examples thereof include condensed aromatic carbocyclic compounds (naphthalene derivatives, anthracene derivatives, phenanthrene derivatives, tetracene derivatives, pyrene derivatives, perylene derivatives and fluoranthene derivatives), nitrogen atom, oxygen atom or sulfur atom-containing 5 to 7-membered heterocyclic compounds (such as pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine and tribenzazepine), polyarylene compounds, fluorene compounds, cyclopentadiene compounds, silyl compounds and metal complexes having a nitrogen-containing heterocyclic compound as a ligand. Without restricting thereto, as far as it is an organic compound larger in the electron affinity than organic compounds used as the donor type organic compounds, it may be used as an acceptor type organic semiconductor.

As a p-type organic dye or n-type organic dye, known dyes may be used. Preferable examples thereof include cyanine dyes, styryl dyes, hemicyanine dyes, merocyanine dyes (including zeromethine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, fulgide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and condensed aromatic carbocyclic dyes (such as naphthalene derivatives, anthracene derivatives, phenanthrene derivatives, tetracene derivatives, pyrene derivatives, perylene derivatives, and fluoranthene derivatives)

Next, the metal complex compound will be described. The metal complex compound is a metal complex having a ligand containing at least one of a nitrogen atom or an oxygen atom or a sulfur atom coordinated to a metal. Though a metal ion in the metal complex is not particularly restricted, it is preferably a beryllium ion, a magnesium ion, an aluminum ion, a gallium ion, a zinc ion, an indium ion, or a tin ion, more preferably a beryllium ion, an aluminum ion, a gallium ion, or a zinc ion, and further preferably an aluminum ion or a zinc ion. As the ligand that is contained in the metal complex, there are various known ligands. Examples thereof include ligands that are described in H. Yersin, "Photochemistry and Photophysics of Coordination Compounds", Springer-Verlag, 1987 and Akio Yamamoto, "Organometallic Chemistry-Basis and Application-", Shokabo Publishing Co., Ltd., 1982.

The ligand is preferably a nitrogen-containing heterocyclic ligand (having preferably 1 to 30 carbon atoms, more preferably 2 to 20 carbon atoms, and particularly preferably 3 to 15 carbon atoms, which may be a monodentate ligand or a bidentate or polydentate ligand, a bidentate ligand being preferable. Examples thereof include preferably a pyridine ligand, a bipyridyl ligand, a quinolinol ligand, a hydroxyphenylazole ligand (such as a hydroxyphenylbenzimidazole ligand, a hydroxyphenylbenzoxazole ligand, and a hydroxyphenylimidazole ligand), an alkoxy ligand (having preferably 1 to 30 carbon atoms, more preferably 1 to 20 carbon atoms, and particularly preferably 1 to 10 carbon atoms, examples thereof include methoxy, ethoxy, butoxy, and 2-ethylhexyloxy), an aryloxy ligand (having preferably 6 to 30 carbon atoms, more preferably 6 to 20 carbon atoms, and particularly preferably 6 to 12 carbon atoms, examples thereof include phenyloxy, 1-naphthyloxy, 2-naphthyloxy, 2,4,6-trimethylphenyloxy, and 4-biphenyloxy), a heteroaryloxy ligand (having preferably 1 to 30 carbon atoms, more preferably 1 to 20 carbon atoms, and particularly preferably 1 to 12 carbon atoms, examples thereof include pyridyloxy, pyrazyloxy, pyrimidyloxy, and quinolyloxy), an alkylthio ligand (having preferably 1 to 30 carbon atoms, more preferably 1 to 20 carbon atoms, and particularly preferably from 1 to 12 carbon atoms, examples thereof include methylthio and ethylthio), an arylthio ligand (having preferably 6 to 30 carbon atoms, more preferably 6 to 20 carbon atoms, and particularly preferably 6 to 12 carbon atoms, examples thereof include phenylthio), a heterocyclic substituted thio ligand (having preferably 1 to 30 carbon atoms, more preferably 1 to 20 carbon atoms, and particularly preferably 1 to 12 carbon atoms, examples thereof include pyridylthio, 2-benzimidazolylthio, 2-benzoxazolylthio, and 2-benzothiazolylthio), or a siloxy ligand (having preferably 1 to 30 carbon atoms, more preferably 3 to 25 carbon atoms, and particularly preferably from 6 to 20 carbon atoms, examples thereof include a triphenylsiloxy group, a triethoxysiloxy group, and a triisopropylsiloxy group), more preferably a nitrogen-containing heterocyclic ligand, an aryloxy ligand, a heteroaryloxy ligand, or a siloxy ligand, and still more preferably a nitrogen-containing heterocyclic ligand, an aryloxy ligand, or a siloxy ligand.

In the invention, it is preferred that a photoelectric conversion film (photosensitive layer) that has, between a pair of electrodes, a p-type semiconductor layer and an n-type semiconductor layer, at least one of the p-type semiconductor and the n-type semiconductor being an organic semiconductor and has, between the semiconductor layers, a bulk heterojunction structure layer containing the p-type semiconductor and the n-type semiconductor as an intermediate layer is contained. By containing the bulk heterojunction structure layer in the photoelectric conversion film like this, a drawback that a carrier diffusion length of an organic layer is short is compensated and thereby the photoelectric conversion efficiency may be improved. The bulk heterojunction structure is described in detail in JP-A No. 2005-303266 (U.S. Patent Application No. 20050205903A1).

Furthermore, in the invention, a case where a photoelectric conversion film (photosensitive layer) that has, between a pair of electrodes, a structure having two or more of a repeating structure (tandem structure) of a pn junction layer formed of the p-type semiconductor layer and the n-type semiconductor layer is contained is preferable, and more preferably a thin layer made of a conductive material is inserted between the repeating structures. The number of the repeating structure (tandem structure) of a pn junction layer is not particularly restricted. From the viewpoint of improving the photoelectric conversion efficiency, the number of the repeating structure of a pn junction layer is preferably 2 to 50, more preferably 2 to 30, and particularly preferably 2 to 10. The conductive material is preferably silver or gold and most preferably silver. The tandem structure is described in detail in JP-A No. 2005-303266 (U.S. Patent Application No. 20050205903A1).

Furthermore, in the invention, in a photoelectric conversion film having, between a pair of electrodes, a layer of a p-type semiconductor and a layer of an n-type semiconductor, more preferably, in addition to the above, a mixed and dispersed (bulk heterojunction structure) layer, the case where the photoelectric conversion film contains an orientation-controlled organic compound in at least one of the p-type semiconductor and the n-type semiconductor is preferable and the case where the photoelectric conversion film contains an orientation-controlled or orientation controllable organic compound in both the p-type semiconductor and the n-type semiconductor is more preferable. As the organic compound used for an organic layer of the photoelectric conversion film, an organic compound having a π-conjugated electron is preferably used. It is preferable that the π-electron plane is not vertical to a substrate (electrode substrate) but is oriented at an angle close to parallel to the substrate as far as possible. The angle to the substrate is preferably 0° or more and 80° or less, more preferably 0° or more and 60° or less, fiurher preferably 0° or more and 40° or less, still further preferably 0° or more and 20° or less, particularly preferably 0° or more and 10° or less, and most preferably 0° (namely: parallel to the substrate). As described above, a layer of the orientation-controlled organic compound may well be partially contained in an entire organic layer. However, a ratio of an orientation-controlled portion to an entire organic layer is preferably 10% or more, more preferably 30% or more, further more preferably 50% or more, still further more preferably 70% or more, particularly preferably 90% or more, and most preferably 100%. In the photoelectric conversion film, by controlling the orientation of the organic compound that is contained in the organic layer, the foregoing state compensates a drawback that the organic layer has a short carrier diffusion length, thereby improving the photoelectric conversion efficiency.

In the case where the orientation of an organic compound is controlled, it is more preferable that the heterojunction plane (for example, a pn junction plane) is not in parallel to a substrate. It is preferable that the heterojunction plane is not in parallel to the substrate (electrode substrate) but is oriented at an angle close to verticality to the substrate as far as possible. The angle to the substrate is preferably 10° or more and 90° or less, more preferably 30° or more and 90° or less, further more preferably 50° or more and 90° or less, still further preferably 70° or more and 90° or less, particularly preferably 80° or more and 90° or less, and most preferably 90° (namely, vertical to the substrate). A layer of the heterojunction plane-controlled organic compound such as mentioned above may be contained at least partially in an entire organic layer. A ratio of the orientation-controlled portion to the whole of the organic layer is preferably 10% or more, more preferably 30% or more, further preferably 50% or more, still further preferably 70% or more, particularly preferably 90% or more, and most preferably 100%. In such the case, an area of the heterojunction plane in the organic layer increases and an amount of carriers such as electrons, holes and pairs of an electron and a hole generated at an interface thereof increases to enable to improve the photoelectric conversion efficiency. In the photoelectric conversion film in which the orientations of both the heterojunction plane and the π-electron plane of the organic compound are controlled as mentioned above, in particular, the photoelectric conversion efficiency may be improved. These states are described in detail in JP-A No. 2006-086493 (U.S. Patent Application No. 20050205903A1).

From the viewpoint of absorbing light from the phosphor film 8, the thickness of the photoelectric conversion film 4 is preferably as thick as possible. However, taking into consideration a ratio that does not contribute to the charge separation, the thickness is preferably 30 nm or more and 300 nm or less, more preferably 50 nm or more and 250 nm or less, and particularly preferably 80 nm or more and 200 nm or less.

In the radiation imaging device 12 shown in FIG. 1, the photoelectric conversion film 4 is formed in one sheet common over all pixel portions. However, the photoelectric conversion film may be divided in correspondence with each of pixel portions.

The lower electrode 2 is formed in a thin film divided in correspondence with each of pixel portions. The lower electrode 2 may be formed from a transparent or non-transparent conductive material, aluminum, silver and the like being preferably used.

The thickness of the lower electrode 2 may be, for instance, 30 nm or more and 300 nm or less.

In the photoelectric conversion portion 13, when a predetermined bias voltage is applied between the upper electrode 6 and the lower electrode 2, one of electric charges (holes and electrons) generated in the photoelectric conversion film 4 is moved to the upper electrode 6 and the other is moved to the lower electrode 2. In the radiation imaging device 12 of the exemplary embodiment, a line is connected to the upper electrode 6 and through the line a bias voltage is applied to the upper electrode 6. The polarity of a bias voltage is determined so that electrons generated in the photoelectric conversion film 4 may move to the upper electrode 6 and holes may move to the lower electrode 2. However, the polarity may be reversed.

The photoelectric conversion portion 13 that constitutes each of the pixel portions may contain at least a lower electrode 2, a photoelectric conversion film 4 and an upper electrode 6. However, in order to inhibit a dark current from increasing, at least one of an electron blocking layer 3 and a hole blocking layer 5 is preferably disposed and both thereof are more preferably disposed.

The electron blocking film 3 may be disposed between the lower electrode 2 and the photoelectric conversion film 4, and when a bias voltage is applied between the lower electrode 2 and the upper electrode 6, electrons are inhibited from injecting from the lower electrode 2 to the photoelectric conversion film 4 to increase the dark current.

For the electron blocking film 3, electron-releasing organic materials may be used. Specific examples thereof include, as low molecular weight materials, aromatic diamine compounds such as N,N'-bis(3-methylphenyl)-(1,1'-biphenyl)-4,4'-diamine (TPD) and 4,4'-bis[N-(naphthyl)-N-phenyl-amino]biphenyl (α-NPD), oxazole, oxadiazole, triazole, imidazole, imidazolone, stilbene derivatives, pyrazoline derivatives, tetrahydroimidazole, polyarylalkane, butadiene, 4,4',4"-tris(N-(3-methylphenyl)N-phenylamino)triphenylamine (m-MTDATA), porphine, tetraphenyl porphine copper, phthalocyanine, copper phthalocyanine, polyphiline compounds such as titanium phthalocyanine oxide, triazole derivatives, oxadizazole derivatives, imidazole derivatives, polyaryl alkane derivatives, pyrazoline derivatives, pyrazolone derivatives, phenylene diamine derivatives, anneal amine derivatives, amino-substituted chalcone derivatives, oxazole derivatives, stylyl anthracene derivatives, fluorenone derivatives, hydrazone derivatives and silazane derivatives, and as high molecular weight materials, polymers of phenylene vinylene, fluorene, carbazole, indole, pyrene, pyrrole, pycoline, thiophene, acetylene and diacetylene and derivatives thereof.

The material that is actually used in the electron blocking film 3 may be selected depending on the material of the adjacent electrode and the material of the adjacent photoelectric conversion film 4. A material that has an electron affinity (Ea) larger by 1.3 eV or more than the work function (Wf) of the material of the adjacent electrode and that has an ionization potential (Ip) the same as or smaller than the Ip of the material of the adjacent photoelectric conversion film 4 is preferable.

The thickness of the electron-blocking film 3 is, in order to assuredly exert a dark current inhibition effect and to prevent the photoelectric conversion efficiency of the photoelectric conversion portion 13 from deteriorating, preferably 10 nm or more and 200 nm or less, more preferably 30 nm or more and 150 nm or less and particularly preferably 50 nm or more and 100 nm or less.

The hole-blocking film 5 may be disposed between the photoelectric conversion film 4 and the upper electrode 6, and inhibit holes from being injected from the upper electrode 6 to the photoelectric conversion film 4 to increase a dark current when a bias voltage is applied between the lower electrode 2 and the upper electrode 6.

Electron-accepting organic materials may be used for the hole-blocking film 5. Examples of the electron-accepting materials include iullerenes including C60 and C70, carbon nano-tubes and derivatives thereof, oxadiazole derivatives such as 1,3-bis(4-tert-butylphenyl-1,3,4-oxadiazolyl)phenylene (OXD-7), anthraquinodimethane derivatives, diphenylquinone derivatives, bathocuproin, bathophenanthroline, and derivatives thereof, triazole compounds, tris(8-hydroxyquinolinate)aluminum complex, bis(4-methyl-8-quinolinate)aluminum complex, distyrylarylene derivatives and silole compounds.

The thickness of the hole-blocking film 5 is, in order to assuredly exert a dark current inhibition effect and to prevent the photoelectric conversion efficiency of the photoelectric conversion portion 13 from deteriorating, preferably 10 nm or more and 200 nm or less, more preferably 30 nm or more and 150 nm or less and particularly preferably 50 nm or more and 100 nm or less.

A material that is actually used for the hole blocking film 5 may be selected depending on a material of an adjacent electrode and a material of an adjacent photoelectric conversion film 4. One that has the ionization potential (Ip) larger by 1.3 eV or more than the work function (Wf) of a material of an adjacent electrode and has the electron affinity (Ea) same as or larger than the Ea of a material of an adjacent photoelectric conversion film 4 is preferred.

When a bias voltage is set so that, among electric charges generated in the photoelectric conversion film 4, holes may move to the upper electrode 6 and electrons may move to the lower electrode 2, positions of the electron-blocking film 3 and the hole-blocking film 5 may be reversed. Furthermore, both the electron-blocking film 3 and hole-blocking film 5 are not necessarily disposed. When any one thereof is disposed, the dark current inhibition effect may be obtained to some extent.

<Signal Output Portion>

Figure 2:
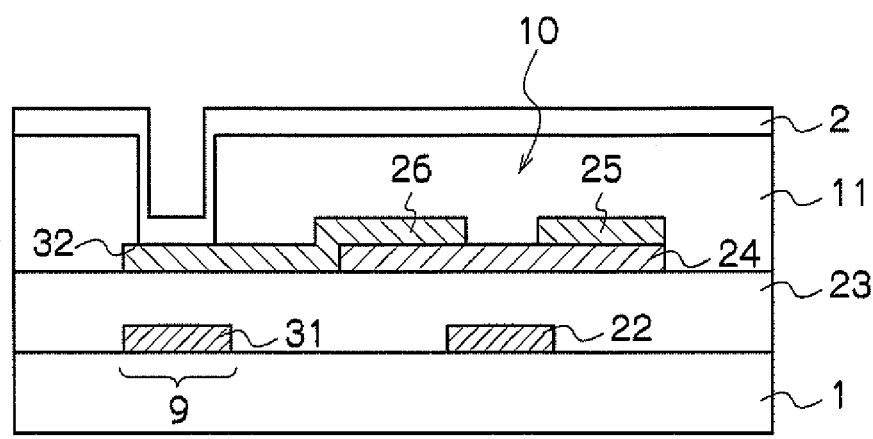
FIG. 2 is a sectional view schematically showing a configuration of a signal output portion of one pixel portion.

On a surface of the substrate 1 below the lower electrode 2 of the respective pixel portions, a signal output portion 14 is formed. FIG. 2 schematically shows a configuration of the signal output portion 14. Corresponding to the lower electrode 2, a capacitor 9 that stores electric charges moved to the lower electrode 2 and a field effect thin film transistor (hereinafter, in some cases, simply referred to as thin film transistor) 10 that converts electric charges stored in the capacitor 9 to a voltage signal and that outputs the signal are formed. A region where the capacitor 9 and the thin film transistor 10 are formed is partially overlapped with the lower electrode 2 in a plan view. When thus configured, in the respective pixel portions, the signal output portion 14 and the photoelectric conversion portion 13 have an overlapping portion in a thickness direction. In order to minimize a plane area of the radiation imaging device 12 (pixel portion), a region where the capacitor 9 and the thin film transistor 10 are formed is preferably completely covered by the lower electrode 2.

The capacitor 9 is electrically connected to a corresponding lower electrode 2 via a wiring of a conductive material formed through an insulating film 11 disposed between the substrate 1 and the lower electrode 2. Thereby, electric charges collected by the lower electrode 2 may be moved to the capacitor 9.

The thin film transistor 10 is formed by a gate electrode 22, a gate insulating film 23 and an active layer (channel layer) 24 deposited in layers and, further, a source electrode 25 and a drain electrode 26 disposed on the active layer 24 at a predetermined interval. In the radiation imaging device 12 of the invention, the active layer 24 is formed of an amorphous oxide. As the amorphous oxide that constitutes the active layer 24, oxides containing at least one of In, Ga and Zn (such as In—O series) are preferred, oxides containing at least two of In, Ga and Zn (such as In—Zn—O series, In—Ga series, Ga—Zn—O series) are more preferred and oxides containing In, Ga and Zn are particularly preferred. As In—Ga—Zn—O series amorphous oxides, amorphous oxides of which crystalline composition is expressed by $InGaO_3(ZnO)_m$ (m: natural number less than 6) are preferred and, in particular, $InGaZnO_4$ is more preferred.

When the active layer 24 of the thin film transistor 10 is formed of an amorphous oxide, radiation such as X-rays is not absorbed or, if absorbed, is only slightly absorbed into the layer; thus, in the signal output portion 14, generation of noise is effectively suppressed.

In the next place, a method of producing the radiation imaging device 12 of the exemplary embodiment will be described.

In the invention, both the amorphous oxide that makes up the active layer 24 of the thin film transistor 10 and the organic photoelectric conversion material that makes up the photoelectric conversion film 4 are formed at a low temperature. Accordingly, as the substrate 1, without restricting to substrates high in the heat resistance such as a semiconductor substrate, a quartz substrate and a glass substrate, flexible substrates such as plastics as well are used. Specific examples of flexible substrates include polyesters such as polyethylene terephthalate, polybutylene phthalate and polyethylene naphthalate, polystyrene, polycarbonate, polyether sulfone, polyallylate, polyimide, polycycloolefin, a norbornene resin, and poly(chlorotrifluoroethylene). The use of the plastic flexible substrate realizes light-weight and is advantageous in transportation and so on.

Furthermore, on the substrate 1, an insulating layer for securing the insulating property, a gas barrier layer for inhibiting moisture and oxygen from permeating and an undercoat layer for improving the flatness or the adhesiveness with an electrode and so on may be disposed.

On the substrate 1, after as needs arise, the insulating layer is formed, the signal output portion 14 is formed.

The thin film transistor 10 and capacitor 9 are formed according to a method such as shown below.

On the insulating substrate 1, for instance, Mo is deposited by sputtering, and thereafter, a gate electrode 22 is formed by patterning by means of photolithography. At this time, a lower electrode 31 of the capacitor 9 may also be simultaneously patterned.

Preferable examples of the materials that form the gate electrode 22 include metals such as Al, Mo, Cr, Ta, Ti, Au and Ag, alloys such as Al—Nd and APC, conductive films of metal oxides such as tin oxide, zinc oxide, indium oxide, indium tin oxide (ITO) and indium zinc oxide (IZO), organic conductive compounds such as polyaniline, polythiophene and polypyrrole, or mixtures thereof.

The thickness of the gate electrode 22 is preferably set at 10 nm or more and 1000 nm or less.

Subsequently, $SiO_2$ or the like is deposited by sputtering to form a gate insulating film 23. Examples of materials that form the gate insulating film 23 include insulators such as $SiO_2$, $SiN_x$, SiON, $Al_2O_3$, $Y_5O_3$, $Ta_2O_5$ and $HfO_2$ or mixed crystal compounds containing at least two of these compounds. Furthermore, a polymer insulator such as polyimide may be used as the gate insulating film 23.

Still furthermore, on the gate insulating film 23, for instance, a polycrystalline sintered body having a composition of $InGaZnO_4$ is used as a target to deposit an IZGO film by sputtering. Since an amorphous oxide semiconductor (EZGO film) is deposited at a low temperature, even when a flexible resin substrate such as plastics is used, without deforming the substrate due to heating, the deposition may be carried out. After the deposition, a patterned active layer 24 is formed by photolithography.

After the active layer 24 is formed, for instance, indium tin oxide (ITO) is deposited by sputtering, followed by, similarly to the patterning of the gate electrode 22, forming a source electrode 25 and a drain electrode 26. At this time, an upper electrode 32 of the capacitor 9 is simultaneously patterned so as to connect with the drain electrode 26.

Preferable examples of the materials that form the source and drain electrodes 25 and 26 include metals such as Al, Mo, Cr, Ta, Ti, Au and Ag, alloys such as Al—Nd and APC, conductive films of metal oxides such as tin oxide, zinc oxide, indium oxide, indium tin oxide (ITO) and indium zinc oxide (IZO), organic conductive compounds such as polyaniline, polythiophene and polypyrrole, or mixtures thereof.

Thicknesses of the source electrode 25 and the drain electrode 26 are preferably set at 10 nm or more and 1000 nm or less.

After that, as a protective film (insulating film) 11, an acrylic photosensitive resin is coated on the substrate 1 by use of a spin coater or the like, followed by exposing so that a contact hole may be formed at a predetermined position, fuirther followed by developing. Thereby, a protective film (insulating film) 11 in which a contact hole is formed may be formed.

After that, as a lower electrode 2 of the photoelectric conversion portion 13, for instance, Mo is deposited by sputtering. Then, according to a method similar to the patterning of the gate electrode 22, the patterning is applied to form a lower electrode 2 divided in correspondence with each of pixel portions. When the lower electrode 2 is divided and formed for each of pixel portions and the photoelectric conversion film 4, the upper electrode 6 and the phosphor film 8 are respectively formed without division and are shared by the plural pixel portions arranged on the substrate 1, the production becomes easy and the production cost may be suppressed low.

After the lower electrode 2 is formed, the electron blocking film, the photoelectric conversion film 4, the hole blocking film and the upper electrode 6 are formed in this order by using the materials respectively described above. Methods of forming the films are not particularly restricted. By considering the aptitude with materials used and so on, a method appropriately selected from wet methods such as a printing method and a coating method, physical methods such as a vacuum deposition method, a sputtering method and an ion plating method and chemical methods such as a CVD method and a plasma CVD method is used to deposit.

When the photoelectric conversion film 4 is formed from amorphous silicon, usually, a CVD unit is necessary, and thereby, the production cost is high. However, in the invention, an organic photoelectric conversion material is used and thereby the photoelectric conversion film 4 is readily formed by use of, for instance, a vacuum deposition method; accordingly, the production cost may be suppressed low.

After the upper electrode 6 is formed, an insulating film 7 is formed. The insulating film 7 is formed as a transparent insulating film 7 so as to allow light from the phosphor film 8 to transmit and may be formed from $SiO_2$, SiN and so on.

Then, the phosphor film 8 is formed. The phosphor film 8 is, although depending on the kind of radiation, an absorption peak wavelength of the photoelectric conversion film 4 and so on, when it is applied to an X-ray imaging unit, formed from, as mentioned above, CsI, CsI (Ti) and so on.

In the next place, operations of the radiation imaging device 12 will be described.

When X-rays are irradiated to a human body and X-rays transmitted through a human body are incident on a phosphor film 8, light having a wavelength in the range of, for instance, 420 to 600 nm is emitted from the phosphor film 8, and the light is incident on a photoelectric conversion film 4. When of the incident light, light having a wavelength region of a green color is absorbed by the photoelectric conversion film 4, here, electric charges are generated, and holes of the generated electric charges move to a lower electrode 2 and are stored in a capacitor 9. The holes stored in the capacitor 9 are converted to a voltage signal by a thin film transistor 10 and outputted. A monochromatic image imaging the inside of a human body is obtained from the voltage signals obtained from the respective pixel portions.

According to the radiation imaging device 12 of the exemplary embodiment, since an organic photoelectric conversion material with which it is easy to control the absorption peak wavelength is used as a material of a photoelectric conversion film 4, the emission peak wavelength of the phosphor film 8 and the absorption peak wavelength of the photoelectric conversion film 4 can be made to substantially coincide; accordingly, the light emitted from the phosphor film 8 is absorbed without waste and the generation of noise when absorbing radiation such as X-rays is effectively suppressed.

When the photoelectric conversion material is not an organic material, for instance, in the case of amorphous silicon, an absorption spectrum is broad; accordingly, a photoelectric conversion portion 13 catches X-ray noise much. In this case, the X-ray noise hardly reaches a signal output portion 14, and even when an amorphous oxide is used for a TFT active layer, the noise reduction effect is hardly obtained. On the other hand, when an organic material is used as a photoelectric conversion material, while an absorption spectrum has a sharp peak and the photoelectric conversion portion 13 hardly absorbs the X-ray noise, X-ray noise that is not absorbed by the photoelectric conversion portion 13 reaches the signal output portion 14; accordingly, the TFT active layer tends to catch the X-ray noise. At that time, when a material that constitutes a TFT active layer is not an amorphous oxide, for instance, in the case of amorphous silicon, the X-ray noise that is not absorbed by the photoelectric conversion portion 13 is absorbed by the TFT active layer; accordingly an advantage of the use of the organic photoelectric conversion material is lost. However, when the TFT active layer is made up of an amorphous oxide, the signal output portion 14 is effectively inhibited from absorbing the X-ray noise. That is, since the active layer 24 of the thin film transistor 10 of the signal output portion 14 is made up of an amorphous oxide, radiation such as X-rays transmitted through the photoelectric conversion portion 13 is hardly absorbed and thereby the noise is effectively inhibited from occurring in the signal output portion 14.

In the invention like this, silicon is not used for the photoelectric conversion film 4 and the active layer 24 of the signal output portion 14, but a photoelectric conversion film 4 made of an organic material and an active layer 24 made of an amorphous oxide are combined and used instead. Accordingly, a state where X-ray noise is absorbed neither in the photoelectric conversion portion 13 nor in the signal output portion 14 is achieved; as the result, in the photoelectric conversion portion 13 and the signal output portion 14, the noise due to radiation such as X-rays is largely reduced.

Furthermore, since the signal output portion 14 and photoelectric conversion portion 13 in each of the pixel portions are formed so as to overlap at least partially in a thickness direction, in comparison with a radiation imaging device where a photoelectric conversion portion 13 and signal output portion 14 are formed on the same plane, an area per pixel is made smaller and a light receiving area due to the photoelectric conversion portion 13 is made larger. Accordingly, when a radiation imaging device 12 is thus configured, the noise due to the radiation and so on in the photoelectric conversion portion 13 and signal output portion 14 is effectively suppressed and a high-definition image may be obtained.

Furthermore, according to the radiation imaging device 12 of the exemplary embodiment, an electron blocking film 3 and a hole blocking film 5 may suppress the dark current; accordingly, a higher quality image may be obtained. When the radiation imaging device 12 is used in a medical filed, an area of an entire pixel portion becomes rather large and, when an area is large, it is expected that electric charges injected from the lower electrode 2 and the upper electrode 6 to the photoelectric conversion film 4 are increased. Accordingly, it is effective to dispose the electron blocking film 3 and hole blocking film 5 to actively inhibit the dark current from occurring.

Still furthermore, according to the radiation imaging device 12 of the exemplary embodiment, after the signal output portion 14 and lower electrode 2 are formed, the respective constituents may be formed by sequentially depositing the respective materials on an entire surface of the substrate. Accordingly, even when an area of the radiation imaging device 12 is made larger, a miniaturization process is not necessitated to increase so much; accordingly, the production thereof is readily carried out.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A radiation imaging device, comprising:
   a phosphor film that emits light by absorbing radiation transmitted through an imaging target;
   a photoelectric conversion portion that includes an upper electrode, a lower electrode, and a photoelectric conversion film disposed between the upper and lower electrodes, the photoelectric conversion film containing an organic photoelectric conversion material that absorbs light emitted from the phosphor film;
   a signal output portion that includes a field effect thin film transistor having an active layer formed from an amorphous oxide and that outputs a signal corresponding to electric charges generated by the photoelectric conversion portion; and
   a substrate on which the signal output portion, the photoelectric conversion portion and the phosphor film are formed in this order, wherein
   a plurality of pixel portions are arranged on the substrate, each of which is made up of a part of the signal output portion, the photoelectric conversion portion and the phosphor film, and the respective parts of the signal output portion and the photoelectric conversion portion in each of the pixel portions are formed so as to have an overlapping portion in a thickness direction.

2. The radiation imaging device of claim 1, wherein the amorphous oxide is an oxide containing at least one selected from the group consisting of In, Ga and Zn.

3. The radiation imaging device of claim 1, wherein the amorphous oxide is an oxide containing at least two selected from the group consisting of In, Ga and Zn.

4. The radiation imaging device of claim 1, wherein the amorphous oxide is an oxide containing In, Ga and Zn.

5. The radiation imaging device of claim 1, wherein a difference between an absorption peak wavelength of the organic photoelectric conversion material and an emission peak wavelength with respect to the radiation of the phosphor film is 5 nm or less.

6. The radiation imaging device of claim 1, wherein the organic photoelectric conversion material is a quinacridone-based organic compound or a phthalocyanine-based organic compound.

7. The radiation imaging device of claim 1, wherein the phosphor film contains cesium iodide.

8. The radiation imaging device of claim 1, wherein the phosphor film absorbs X-rays to emit light.

9. The radiation imaging device of claim 1, wherein the phosphor film contains cesium iodide to which titanium has been added.

10. The radiation imaging device of claim 1, wherein the lower electrode is divided in correspondence with each of pixel portions, and the photoelectric conversion film, the upper electrode and the phosphor film are respectively formed without division and are shared by the plurality of pixel portions arranged on the substrate.

11. The radiation imaging device of claim 1, wherein the upper electrode is formed of ITO.

12. The radiation imaging device of claim 1, wherein, between the lower electrode and the photoelectric conversion film, an electric charge blocking film is provided that, when a bias voltage is applied between the lower electrode and the upper electrode, inhibits electric charges from being injected from the lower electrode to the photoelectric conversion film.

13. The radiation imaging device of claim 1, wherein, between the upper electrode and the photoelectric conversion film, an electric charge blocking film is provided that, when a bias voltage is applied between the lower electrode and the upper electrode, inhibits electric charges from being injected from the upper electrode to the photoelectric conversion film.

14. The radiation imaging device of claim 1, wherein the substrate is a flexible substrate.

* * * * *